(12) United States Patent
Hoversten et al.

(10) Patent No.: US 10,884,150 B2
(45) Date of Patent: Jan. 5, 2021

(54) SYSTEMS AND METHODS FOR USING PROBABILITIES OF LITHOLOGIES IN AN INVERSION

(71) Applicant: Chevron U.S.A. Inc., San Ramon, CA (US)

(72) Inventors: Gary Michael Hoversten, Lafayette, CA (US); Laura Bandura, Houston, TX (US); Adam Halpert, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 332 days.

(21) Appl. No.: 15/943,535

(22) Filed: Apr. 2, 2018

(65) Prior Publication Data

US 2019/0302295 A1  Oct. 3, 2019

(51) Int. Cl.
*G01V 1/34* (2006.01)
*G01V 1/30* (2006.01)
*G01V 1/28* (2006.01)

(52) U.S. Cl.
CPC .............. *G01V 1/345* (2013.01); *G01V 1/282* (2013.01); *G01V 1/307* (2013.01); *G01V 2210/632* (2013.01); *G01V 2210/66* (2013.01)

(58) Field of Classification Search
CPC ......... G01V 1/282; G01V 1/307; G01V 1/345
USPC .......................................................... 702/16
See application file for complete search history.

(56) References Cited

U.S. PATENT DOCUMENTS

| 5,706,194 | A | 1/1998 | Neff |
| 9,852,373 | B2 | 12/2017 | De Stefano |
| 2011/0048731 | A1* | 3/2011 | Imhof ............... G01V 1/302 166/369 |
| 2016/0313463 | A1 | 10/2016 | Wahrmund |
| 2017/0153344 | A1* | 6/2017 | Lafet ............... G01V 1/306 |

(Continued)

FOREIGN PATENT DOCUMENTS

WO   2017139271   8/2017

OTHER PUBLICATIONS

Hamson-Russell. "Software & Services, Qualify and Quantify Your Reservoir," cggveritas.com/hampson-russell, 2010 Software and Services, [retrieved on May 24, 2019]. Retrieved from the Internet: <URL:https:I/www.cgg.com/data/1/rec_docs/502_ hr_07.pdf> pp. 1-23.

(Continued)

*Primary Examiner* — Eman A Alkafawi
(74) *Attorney, Agent, or Firm* — Esplin & Associates, PC

(57) ABSTRACT

Systems and methods for training a model that uses probabilities of lithologies as prior information in an inversion are disclosed. Exemplary implementations may: obtain training data, the training data including (i) subsurface map data sets, and (ii) known lithologies; obtain an initial seismic mapping model; generate a conditioned seismic mapping model by training the initial seismic mapping model; store the conditioned seismic mapping model; obtain a target subsurface map data set; apply the conditioned seismic mapping model to generate a classified lithology map data set; apply an inversion to the classified lithology map data set to generate volumes of lithologies; generate an image that represents the volumes of lithologies; display the image.

19 Claims, 14 Drawing Sheets

(56) References Cited

U.S. PATENT DOCUMENTS

2018/0156932 A1* 6/2018 Sain ...................... G01V 11/00

OTHER PUBLICATIONS

PCT International Search Report and Written Opinion, International Application No. PCT/US19/24494, dated Jun. 20, 2019. (12 pages).

* cited by examiner

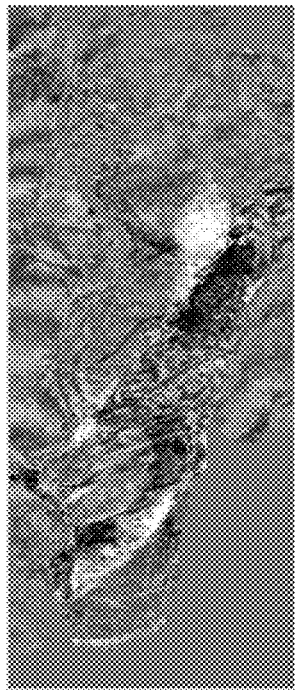
FIG. 6A
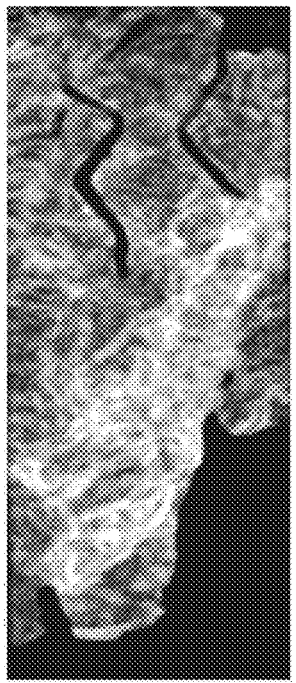
FIG. 6B
FIG. 6C
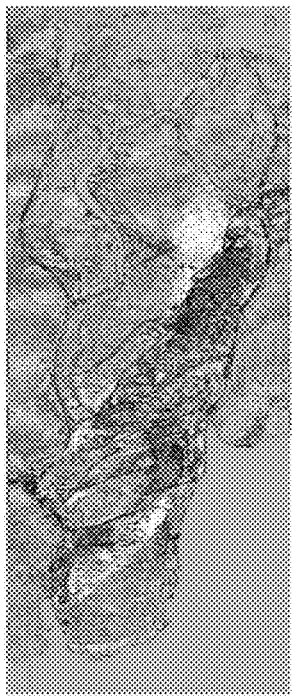
FIG. 6D
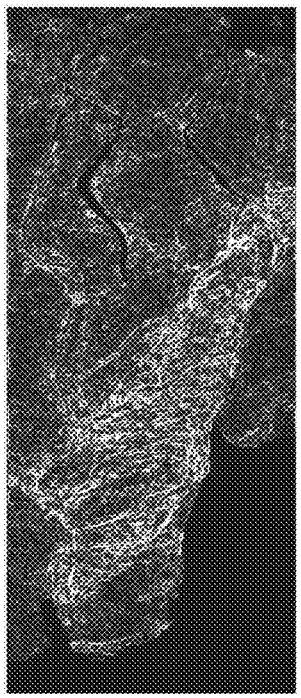
FIG. 6E
FIG. 6F

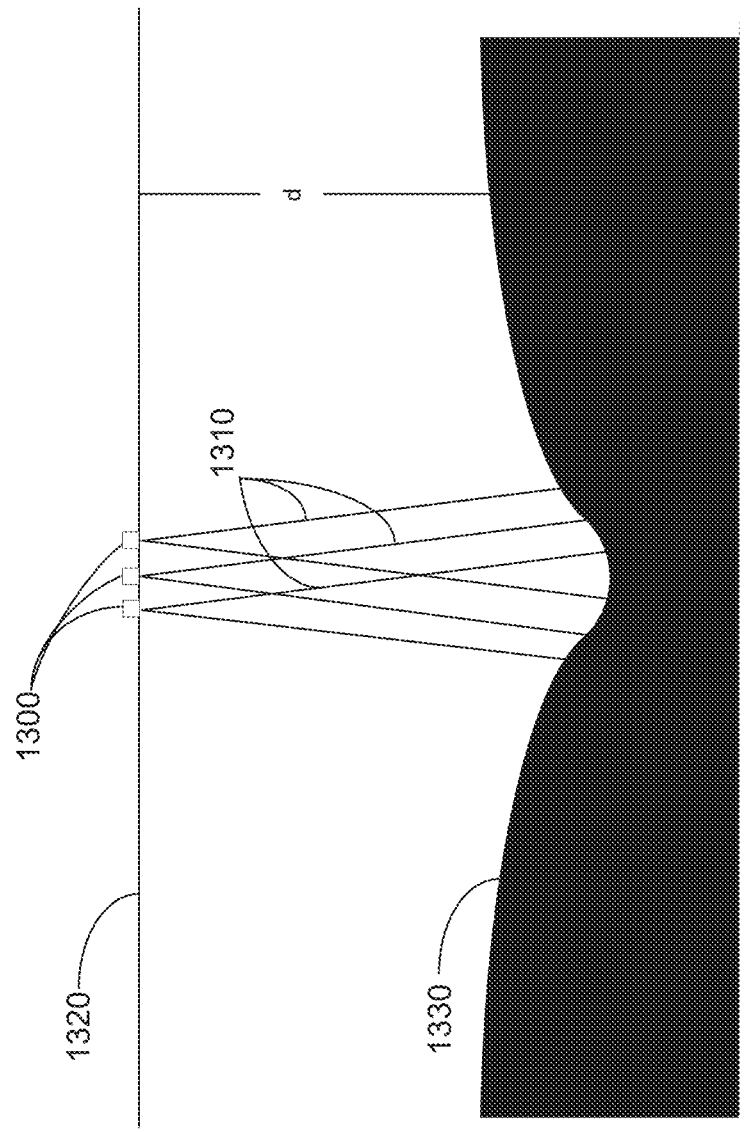

SYSTEMS AND METHODS FOR USING PROBABILITIES OF LITHOLOGIES IN AN INVERSION

FIELD OF THE DISCLOSURE

The present disclosure relates to systems and methods for estimating lithologies within a subsurface volume of interest.

BACKGROUND

Determining a probability of a lithology within a subsurface volume of interest may be challenging due to the limited amount of available subsurface data. A problem is limited estimates of subsurface parameters, such as lithology types at well locations. This limited spatial sampling makes it difficult to interpolate parameters needed for accurate amplitude versus angle of incidence (AVA) inversion. This is particularly important for stochastic AVA inversion because the spatial distribution of lithology probability is important prior information that guides the inversion.

SUMMARY

An aspect of the present disclosure relates to a system configured for using probabilities of lithologies as prior information in an inversion. The system may include non-transient electronic storage, memory, one or more programs, and one or more physical computer processors configured by machine-readable instructions. The processor(s) may be configured to obtain, from the electronic storage, training data. The training data may include subsurface map data sets specifying textural attribute values as a function of position corresponding to a subsurface volume of interest. The training data may include known lithologies as a function of position within the subsurface volume of interest, such that the textural attribute values of the lithologies are known as a function of position within the subsurface volume of interest. The processor(s) may be configured to obtain an initial seismic mapping model from the electronic storage. The processor(s) may be configured to generate a conditioned seismic mapping model by training, on the one or more physical computer processors using the training data, the initial seismic mapping model. The processor(s) may be configured to store the conditioned seismic mapping model in the electronic storage. The processor(s) may be configured to obtain a target subsurface map data set. The processor(s) may be configured to apply the conditioned seismic mapping model to the target subsurface map data set to generate a classified lithology map data set. The processor(s) may be configured to apply an inversion to the classified lithology map data set to generate volumes of lithologies specifying parameters for individual lithologies as a function of position within the subsurface volume of interest. The processor(s) may be configured to generate an image that represents the volumes of lithologies using visual effects to depict at least a portion of the parameters in the volumes of lithologies. The processor(s) may be configured to display, on a graphical user interface, the image.

An aspect of the present disclosure relates to a method for training a model to estimate lithologies as a function of position within a subsurface volume of interest. The method may include obtaining, from the electronic storage, training data. The training data may include subsurface map data sets specifying textural attribute values as a function of position corresponding to the subsurface volume of interest. The training data may include known lithologies as a function of position within the subsurface volume of interest, such that the textural attribute values of the lithologies are known as a function of position within the subsurface volume of interest. The method may include obtaining an initial seismic mapping model from the electronic storage. The method may include generating a conditioned seismic mapping model by training, on the one or more physical computer processors using the training data, the initial seismic mapping model. The method may include storing the conditioned seismic mapping model in the electronic storage.

An aspect of the present disclosure relates to a method for estimating lithologies as a function of position within a subsurface volume of interest. The method may include obtaining a target subsurface map data set. The method may include obtaining a conditioned seismic mapping model from the electronic storage. The conditioned seismic mapping model may have been conditioned by training an initial mapping model. The training data may include subsurface map data sets specifying textural attribute values as a function of position corresponding to a subsurface volume of interest. The training data may include known lithologies as a function of position within the subsurface volume of interest, such that the textural attribute values of the lithologies are known as a function of position within the subsurface volume of interest. The method including applying the conditioned seismic mapping model to the target subsurface map data set to generate a classified lithology map data set. The method including generating an image that represents the classified lithology map data set using visual effects to depict at least a portion of the estimated lithologies in the classified lithology map data set as a function of position within the subsurface volume of interest. The method including displaying, on a graphical user interface, the image.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as limiting. As used in the specification and in the claims, the singular form of "a", "an", and "the" include plural referents unless the context clearly dictates otherwise.

BRIEF DESCRIPTION OF THE DRAWINGS

The technology disclosed herein, in accordance with one or more various implementations, is described in detail with reference to the following figures. The drawings are provided for purposes of illustration only and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 6A illustrates an original image of a flattened slice, in accordance with one or more implementations.

FIG. 6B illustrates a textural attribute applied to an image, in accordance with one or more implementations.

FIG. 6C illustrates a textural attribute applied to an image, in accordance with one or more implementations.

FIG. 6D illustrates a textural attribute applied to an image, in accordance with one or more implementations.

FIG. 6E illustrates a textural attribute applied to an image, in accordance with one or more implementations.

FIG. 6F illustrates a textural attribute applied to an image, in accordance with one or more implementations.

FIG. 13 illustrates a layout to obtain subsurface data, in accordance with one or more implementations.

DETAILED DESCRIPTION

Systems and methods configured to estimate lithologies as a function of position within a subsurface volume of interest are often constrained by various elements. Stochastic AVA inversion may find posterior distributions of unknown seismic and reservoir parameters. An input to finding posterior distributions may be generated from some form of interpolation of the lithology found in available well logs. Wells provide one source of information to estimate lithologies since lithologies may be known within a well. The estimated probabilities may not be fixed and the inversion may change the lithologies to appropriately fit data. However, the prior probabilities may guide the initial sampling and control outputs when there is not enough information about the lithology, such as when there are few wells within a subsurface volume of interest. Here, one of the inputs may be generated by machine learning techniques from available well log data and seismic AVA data. Use of machine learning techniques to estimate the spatial distribution of lithology probabilities for input as prior information in stochastic inversion algorithm may offer considerable advantage over other interpolation or Kriging of lithology probabilities away from well control. Using seismic data analyzed spatially in addition to well log data may provide more accurate estimations. Seismic data may include sending energy into a subsurface volume of interest using a seismic source and receiving the signal reflected off of a subsurface feature at a seismic receiver.

A seismic source may send seismic energy into the subsurface, which may then be reflected and/or refracted by subsurface features and may be recorded at seismic receivers at various distances away from a seismic source. Seismic energy may include acoustic compression waves. For example, the seismic source may generate acoustic compression waves and direct them towards a subsurface region that includes various lithologies (e.g., underground rock structures) for the purpose of identifying hydrocarbon deposits contained within the various lithologies (e.g., crude oil, natural gas, etc.). Seismic data may be generated from seismic signals (e.g., the reflections of the seismic energy off of the various subsurface lithologies) received by seismic sensors, such as geophones or other acoustic detectors.

FIG. 13 illustrates a layout to obtain seismic data, in accordance with one or more implementations. Zero-offset source-receiver pairs 1300 may send energy waves 1310 into subsurface region 1320. They may reflect or refract off subsurface feature 1330. Source-receiver pairs 1300 may receive the reflected and refracted energy waves 1310 which may be converted into seismic data.

Figure 8A:
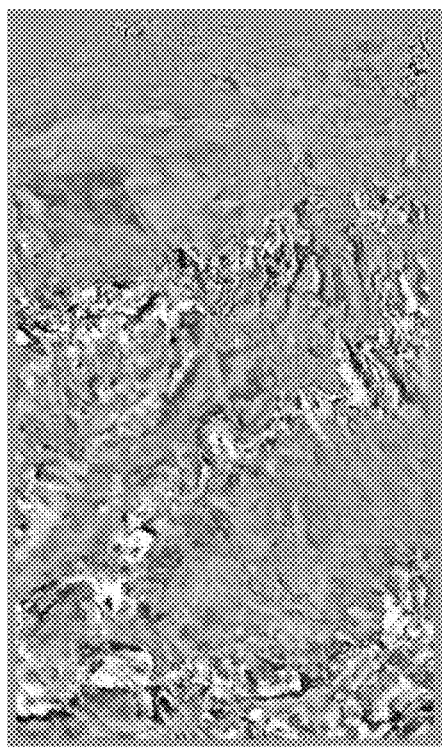
FIG. 8A illustrates an original image of a flattened slice, in accordance with one or more implementations.
Figure 8B:
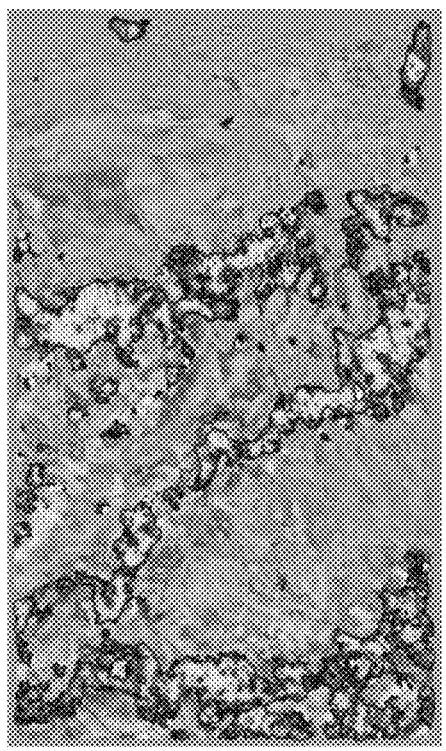
FIG. 8B illustrates a volume of channel probabilities within a subsurface volume of interest, in accordance with one or more implementations.

The seismic data may be flattened. Seismic flattening may be a visualization technique where mapped horizons are draped with amplitude and flattened to visualize a depositional surface with structure removed. Volumetric flattening may include seismic flattening of full seismic volumes, as shown in FIGS. 5A-8B. Flattened stratigraphic features are interpreted on stratal slices, or based on depth. Some trace attributes, instantaneous amplitude, frequency, phase, sweetness, and/or other trace attributes are performed vertically. In some implementations, features may be more obvious using seismic flattening. For example, FIG. 8A illustrates a flattened image, and FIG. 8B illustrates a textural attribute applied to the flattened image of FIG. 8A. Channel probabilities are heightened in FIG. 8B. Moreover, textural attributes can be applied spatially to help evaluate subsurface features, as shown in FIGS. 6B-6F, 7B-7E, and 8B. Applying textural attributes to well data and seismic data, a model may be trained using machine learning to estimate lithologies at the well. Using flattened data of a subsurface volume of interest surrounding the well, the trained model may be applied to the flattened data to generate an image that estimates lithologies as a function of position within the subsurface volume of interest, as shown in FIGS. 8B and 9-12B.

Figure 1:
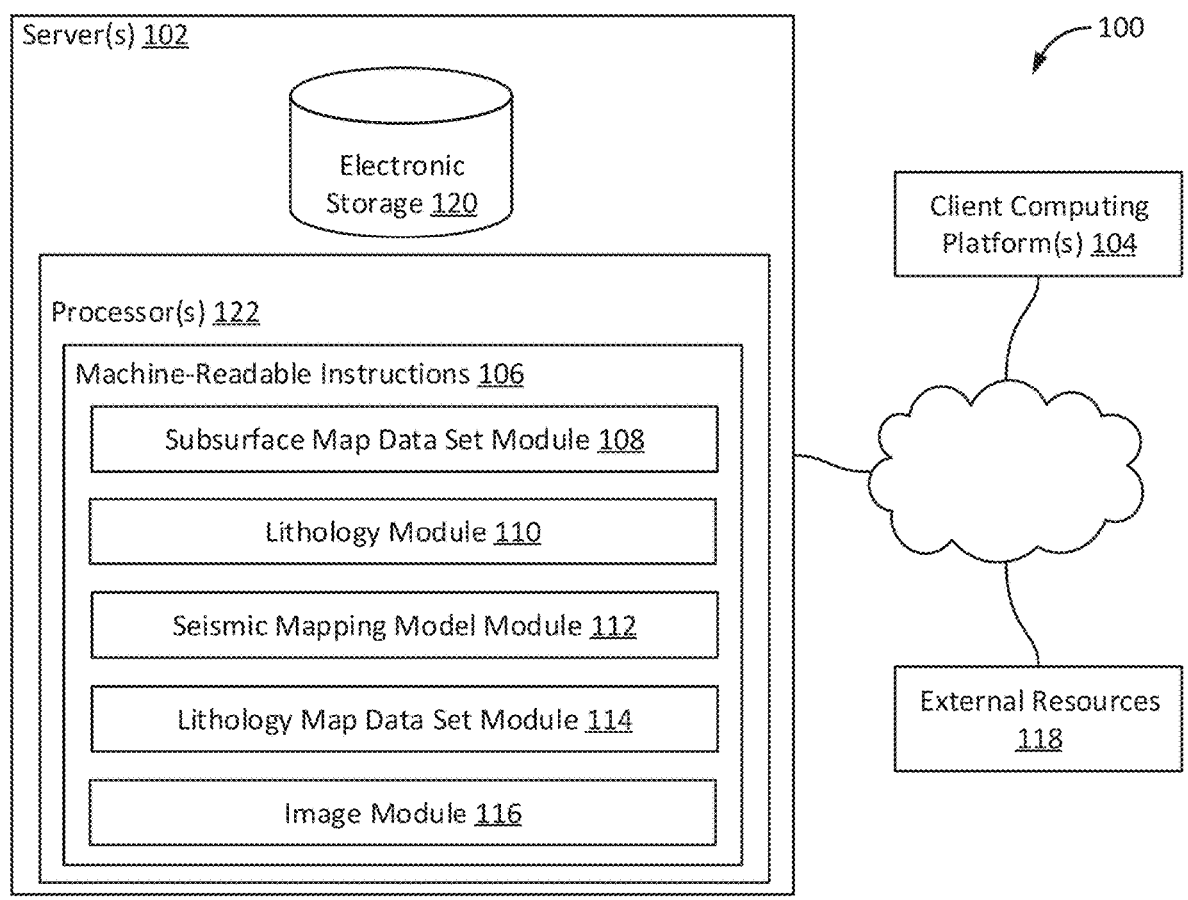
FIG. 1 illustrates a system configured for estimating lithologies within a subsurface volume of interest, in accordance with one or more implementations.

FIG. 1 illustrates a system 100 configured for estimating lithologies within a subsurface volume of interest, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of a subsurface map data set module 108, a lithology module 110, a seismic mapping model module 112, a lithology map data set module 114, an image module 116, and/or other instruction modules.

Subsurface map data set module 108 may be configured to obtain, from the electronic storage, training data, the training data including subsurface map data sets specifying textural attribute values as a function of position corresponding to a subsurface volume of interest. Subsurface map data may be derived from seismic data of the subsurface volume of interest obtained using the layout of FIG. 13. Subsurface map data may be derived from well data of the subsurface volume of interest. The seismic data and well data may be seismic images and/or cubes. The seismic data and well data may or may not be flattened. Textural attributes may be applied to both of the seismic data and the well data to generate subsurface map data sets specifying textural attribute values.

Textural attributes may be visual filters calculated spatially. Textural attributes may be used for smoothing, noise removal, background removal, feature enhancement, edge detection, image uncertainty, local continuity, and/or other filtering. Textural attributes may include, mean, median, minimum, maximum, bilateral filter, Kuwahara filter, Gaussian blur, Laplacian, Anisotropic diffusion, Hessian, membrane projection, Lipschitz filter, structure, difference of Gaussians, neighbors, variance, entropy, derivatives, Gabor filter, Sobel filter, and/or other textural attributes. Textural attribute values may be spatial outputs of the textural attributes as applied to the seismic data.

Subsurface map data set module 108 may be configured to obtain a target subsurface map data set. The target subsurface map data set may specify textural attribute values derived from seismic data corresponding to the surrounding subsurface volume of interest. The textural attribute values may be specified as a function of position within the subsurface volume of interest surrounding the well.

Lithology module 110 may be configured to obtain, from the electronic storage, training data, the training data including known lithologies as a function of position within the subsurface volume of interest, such that the textural attribute values of the lithologies are known as a function of position within the subsurface volume of interest. The known lithologies and the corresponding textural attribute values may be derived from well data. The lithologies may include sand, shale, rocks, and/or other lithologies.

Lithology module 110 may be configured to apply an inversion to the classified lithology map data set to generate volumes of lithologies specifying parameters for individual lithologies as a function of position within the subsurface volume of interest. The classified lithology map data set may be used as input for an inversion. The inversion may be post-stack, pre-stack, stochastic, amplitude variation with angle of incidence (AVA) inversion, and/or other types of inversion. The inversion may use geostatistical techniques, such as Markov Chain Monte Carlo sampling, Gaussian lithology modeling, and/or other techniques. For example, the inversion may be a stochastic AVA inversion. Stochastic AVA inversion may be used to find the posterior distribution of unknown seismic and reservoir parameters. The posterior may be represented by $f(\alpha,Z,\rho,\varnothing,L,\theta|A,L\_ref)$. The posterior may be found by $f(\alpha,Z,\rho,\varnothing,L,\theta|A,L\_ref) \propto f(A|\alpha,Z,\rho,\theta) \times f(\alpha,Z,\rho,L,\varnothing|L) \times f(L\_ref|L) \times f(L) \times f(\theta)$, where $\alpha$, $Z,\rho,\varnothing,L,\theta,A$, $L\_ref$, are Vp/Vs ratio, acoustic impedance, density, porosity, Lithology, data SNR, Seismic AVA data, and prior lithology probability, respectively. L_ref may be generated by systems and methods described herein using available well log data and seismic AVA data. L_ref may use the estimated probabilities of the classified lithology map data set as an input. The posterior outputs volumes of lithologies and rock parameters (e.g., seismic velocity, density, porosity, fluid saturations, etc.) of the subsurface volume of interest using the spatially interpolated seismic data.

Figures 14A, 14B:
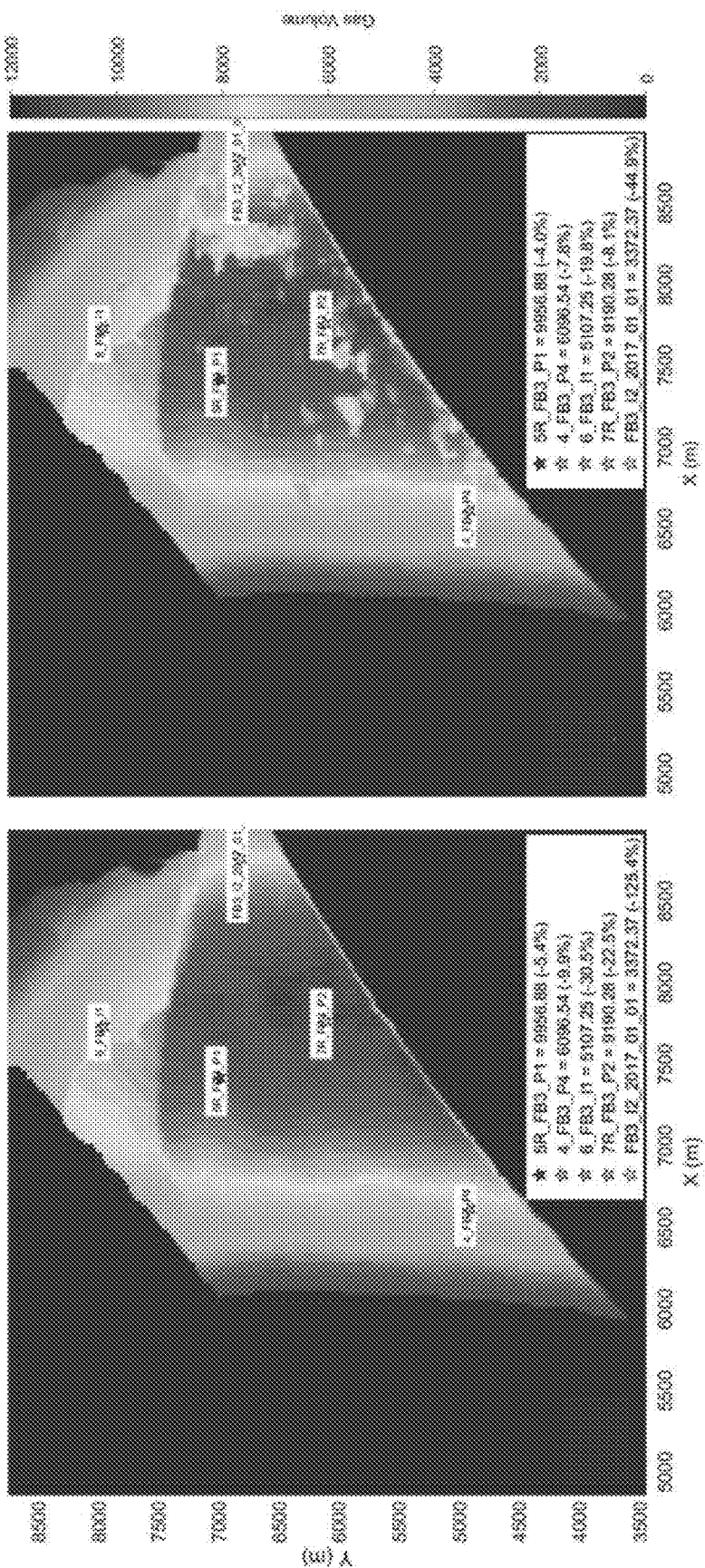
FIG. 14A illustrates a volume of lithologies in the gas cap of a reservoir using interpolation from wells, in accordance with one or more implementations.
FIG. 14B illustrates a volume of lithologies in the gas cap of a reservoir using the systems and methods disclosed herein, in accordance with one or more implementations.

For example, FIGS. 14A and 14B illustrate a volume of lithologies in the gas cap of a reservoir, in accordance with one or more implementations. FIG. 14A illustrates the predicted gas volume using lithology probability interpolated from wells. The starred data points indicate wells, which were used in interpolating the volume of lithologies. The legends indicate the percent error between the well volume and the inversion prediction. The average error in is about 38.6%.

On the other hand, FIG. 14B illustrates the predicted gas volume using the systems and methods disclosed herein. The same wells were used as in FIG. 14A, but the prior lithologies were determined using the systems and methods disclosed herein. The average percent error for this graph is about 16.9%.

Referring back to FIG. 1, seismic mapping module 112 may be configured to obtain an initial seismic mapping model from the electronic storage. An initial seismic mapping model may include a random decision forest, neural network, linear regression, principal component analysis, and/or another machine learning technique. For example, a random decision forest may include multiple decision trees, such that individual decision trees have a random subset of the available textural attributes. The multiple decision trees may be used to determine the proper classification of a lithology through patterns in the well data and seismic data. Individual trees may use a voting mechanism to help determine the probability of a lithology as a function of position in the subsurface volume of interest.

Seismic mapping model module 112 may be configured to generate a conditioned seismic mapping model by training, on the one or more physical computer processors using the training data, the initial seismic mapping model. The conditioned seismic mapping model may include a random decision forest, neural network, linear regression, principal component analysis, and/or another machine learning technique. The conditioned seismic mapping model may be able to estimate lithologies from a given subsurface map data set by recognizing similar textural attribute values, or patterns in the textural attributes values corresponding to a given lithology (e.g., from the training data), in the given subsurface map data set. Individual subsurface map data may overlap to help train the conditioned seismic mapping model.

Seismic mapping model module 112 may be configured to store the conditioned seismic mapping model in the electronic storage.

Lithology map data set module 114 may be configured to apply the conditioned seismic mapping model to the target subsurface map data set. Using the patterns developed by training the initial seismic mapping model with the subsurface map data set, the conditioned seismic mapping model may generate a classified lithology map data set. The target subsurface map data set may correspond to the surrounding subsurface volume of interest around one of the wells used for the training data. The classified lithology map data set estimates lithologies as a function of position within the subsurface volume of interest. The estimated lithologies may be based on textural attribute values specified in the target subsurface map data set.

Image module 116 may be configured to generate an image that represents the classified lithology map data set using visual effects to depict at least a portion of the estimated lithologies in the classified lithology map data set as a function of position within the subsurface volume of interest. The image may be of a two dimensional or a three dimensional image. The images may be manipulated to focus on certain aspects of the subsurface volume of interest, expand a viewable portion of the image, and/or otherwise manipulated. The image may indicate shale probabilities, sand probabilities, and/or other lithology probabilities as a function of position within the subsurface volume of interest.

Figure 9:
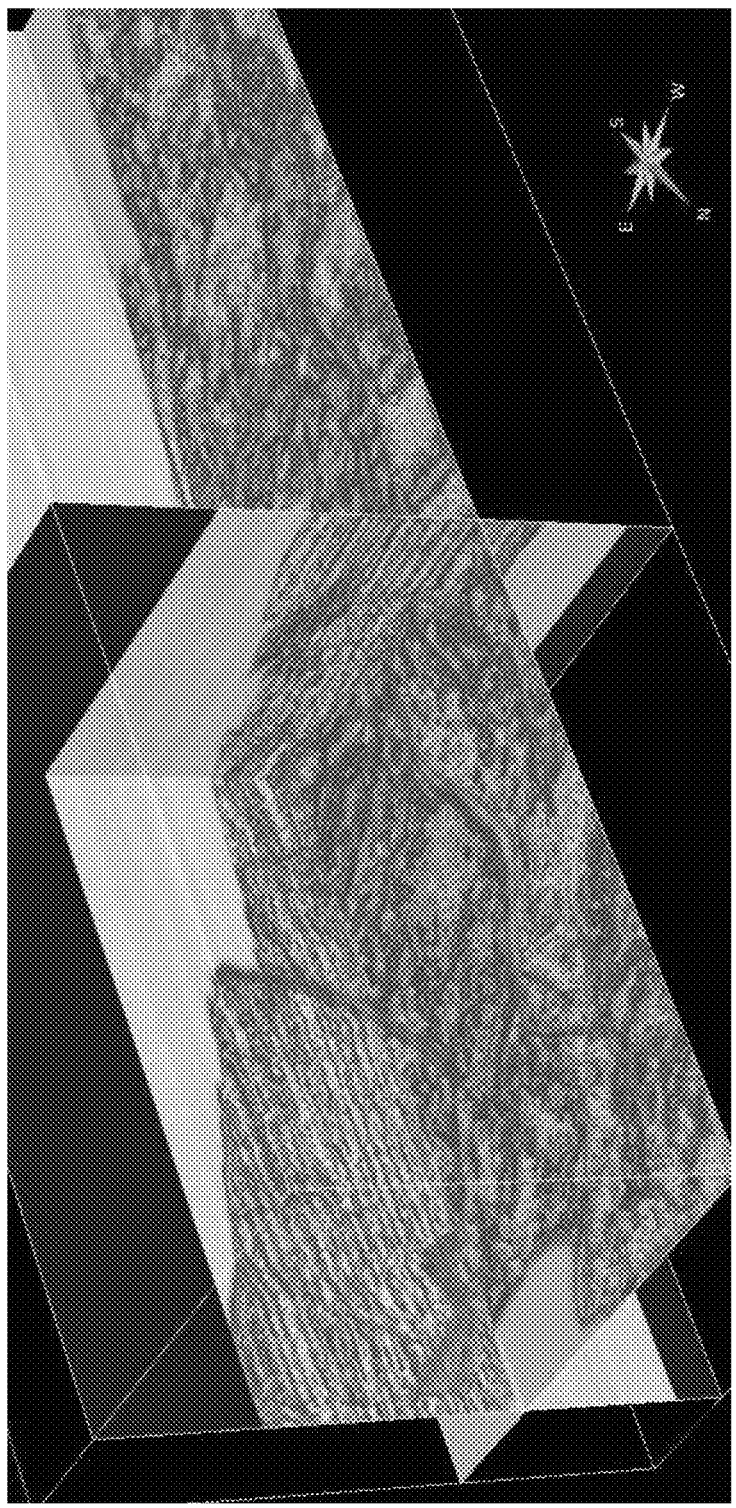
FIG. 9 illustrates a probability of sand within a subsurface volume of interest, in accordance with one or more implementations.
Figure 10A:
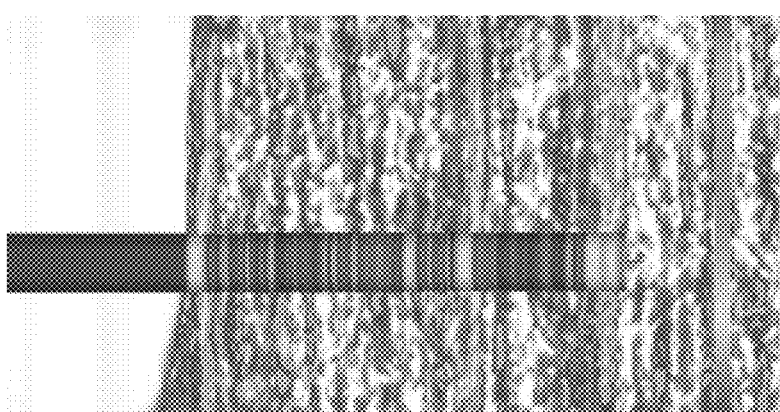
FIG. 10A illustrates probabilities of lithologies within a subsurface volume of interest, in accordance with one or more implementations.
Figure 10B:
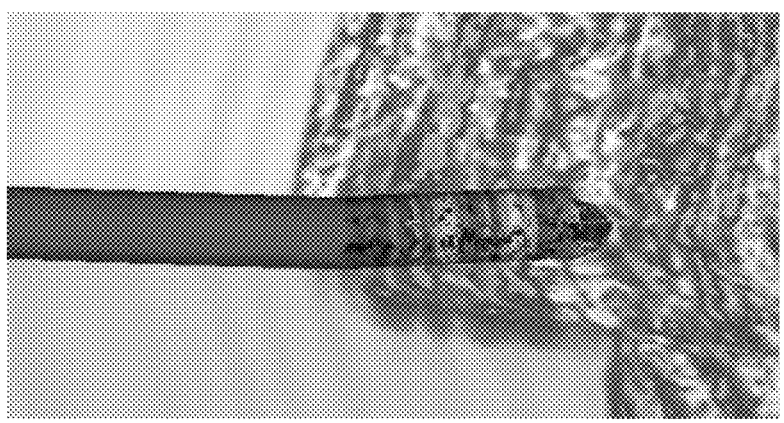
FIG. 10B illustrates probabilities of lithologies within a subsurface volume of interest, in accordance with one or more implementations.
Figure 10C:
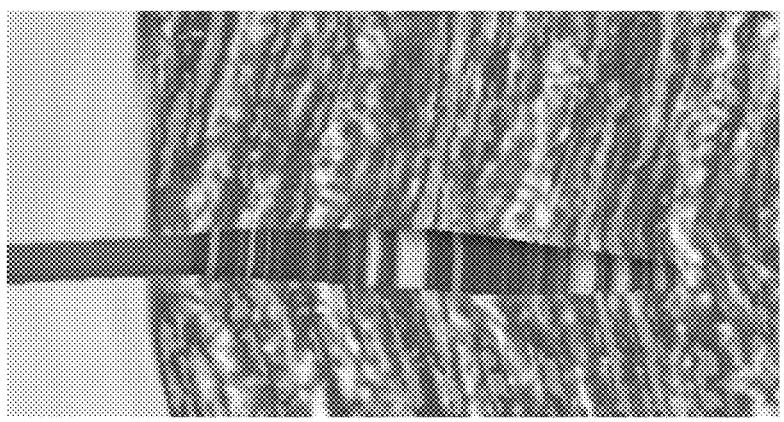
FIG. 10C illustrates probabilities of lithologies within a subsurface volume of interest, in accordance with one or more implementations.
Figure 10D:
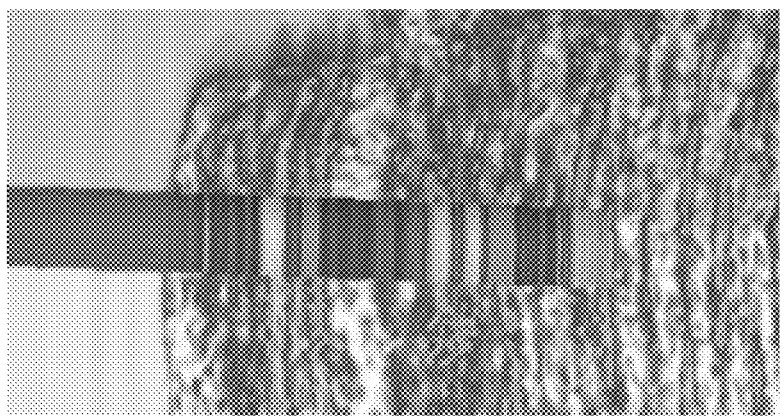
FIG. 10D illustrates probabilities of lithologies within a subsurface volume of interest, in accordance with one or more implementations.
Figure 11:
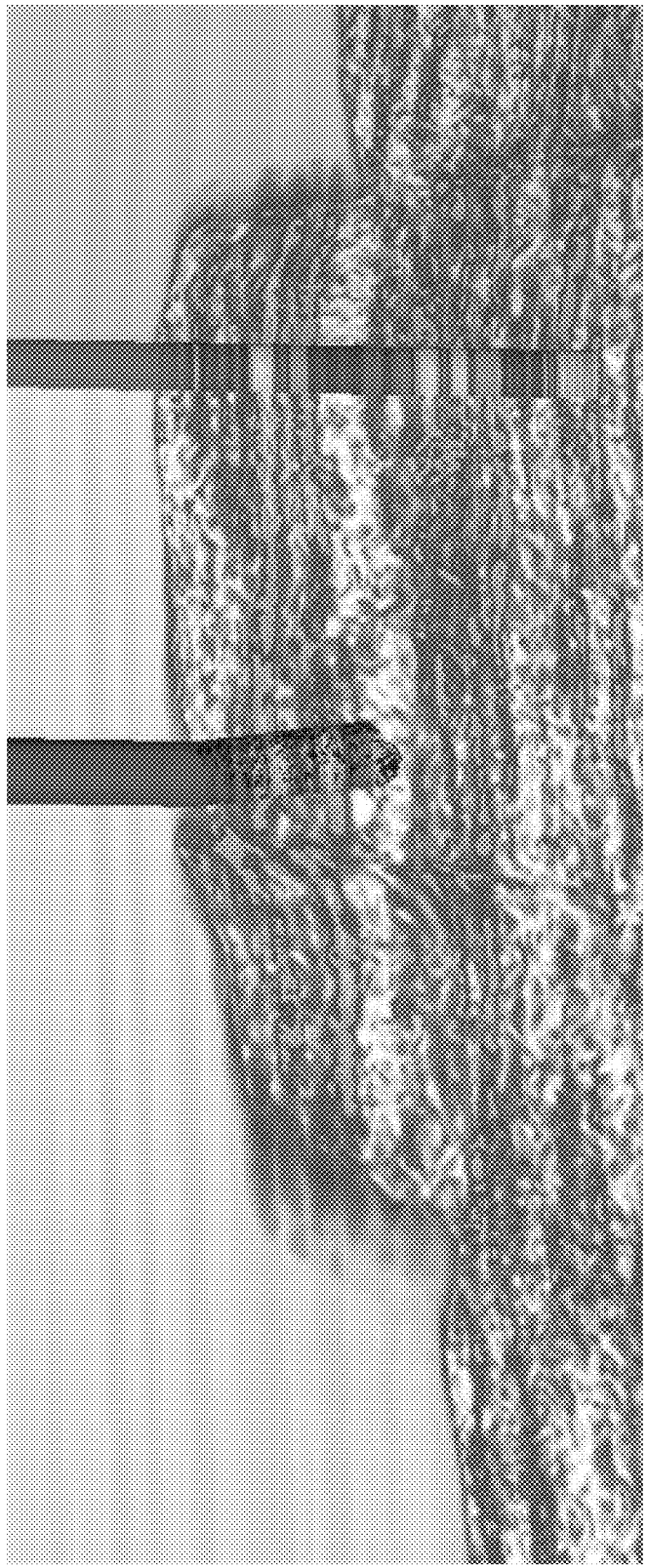
FIG. 11 illustrates probabilities of lithologies within a subsurface volume of interest, in accordance with one or more implementations.
Figure 12A:
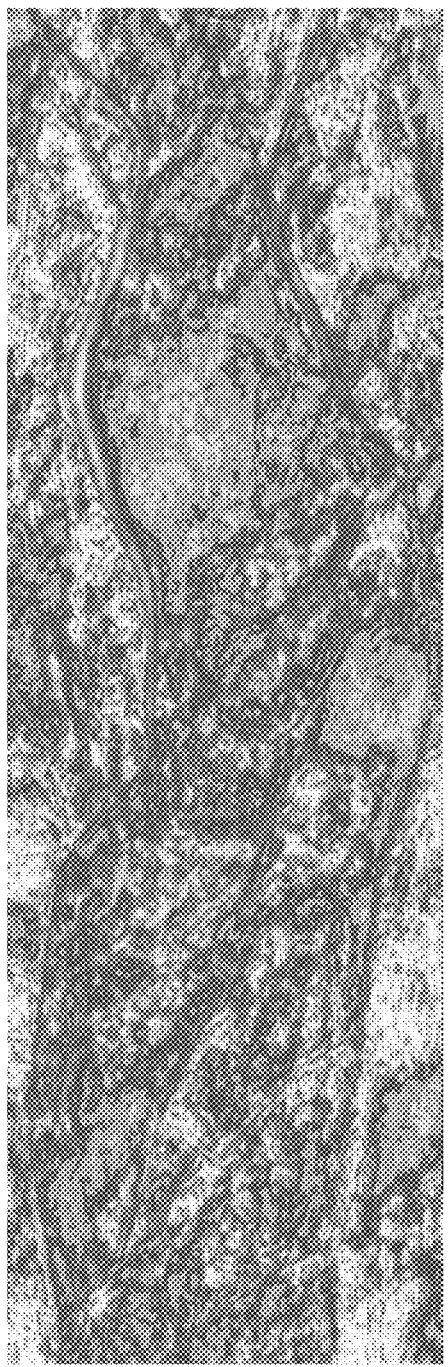
FIG. 12A illustrates probabilities of lithologies within a subsurface volume of interest, in accordance with one or more implementations.
Figure 12B:
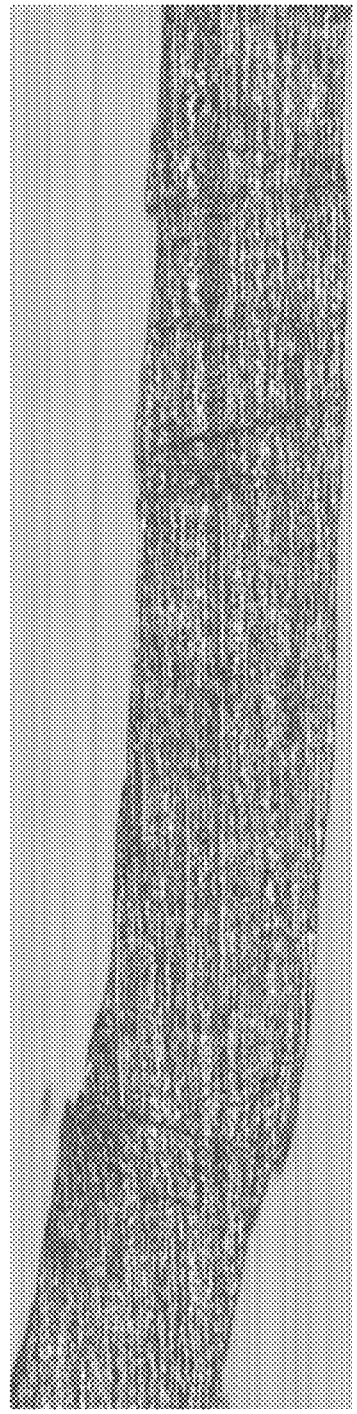
FIG. 12B illustrates probabilities of lithologies within a subsurface volume of interest, in accordance with one or more implementations.

The visual effects may refer to a change in presentation of the image on a display. In some implementations, the visual effects may include one or more visual transformations of the image. The visual effects may help distinguish between different lithologies, as shown in FIGS. 9-12B. Referring to FIG. 9, the visual effects may help illustrate the probability of finding lithology, such as sand, in a subsurface volume of interest. Individual pixels indicate the probability of sand in the subsurface volume of interest. Referring to FIGS. 10A-11, the visual effects may help illustrate the estimated volume of shale compared to the estimated volume of sand surrounding the estimated shale volume. and the volume of shale compared against each other near one or more wells. Referring to FIGS. 12A and 12B, the visual effects may help illustrate the probability of finding different lithologies within the subsurface volume of interest.

Image module 116 may be configured to display, on a graphical user interface, the image.

In some implementations, server(s) 102, client computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may include non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute modules 108, 110, 112, 114, 116, and/or other modules. Processor(s) 122 may be configured to execute modules 108, 110, 112, 114, 116, and/or other modules by software; hardware; firmware; some combination of software, hardware, and/or firmware; and/or other mechanisms for configuring processing capabilities on processor(s) 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, and 116 are illustrated in FIG. 1 as being implemented within a single processing unit, in implementations in which processor(s) 122 includes multiple processing units, one or more of modules 108, 110, 112, 114, and/or 116 may be implemented remotely from the other modules. The description of the functionality provided by the different modules 108, 110, 112, 114, and/or 116 described below is for illustrative purposes, and is not intended to be limiting, as any of modules 108, 110, 112, 114, and/or 116 may provide more or less functionality than is described. For example, one or more of modules 108, 110, 112, 114, and/or 116 may be eliminated, and some or all of its functionality may be provided by other ones of modules 108, 110, 112, 114, and/or 116. As an example, processor(s) 122 may be configured to execute one or more additional modules that may perform some or all of the functionality attributed below to one of modules 108, 110, 112, 114, and/or 116.

Figure 2:
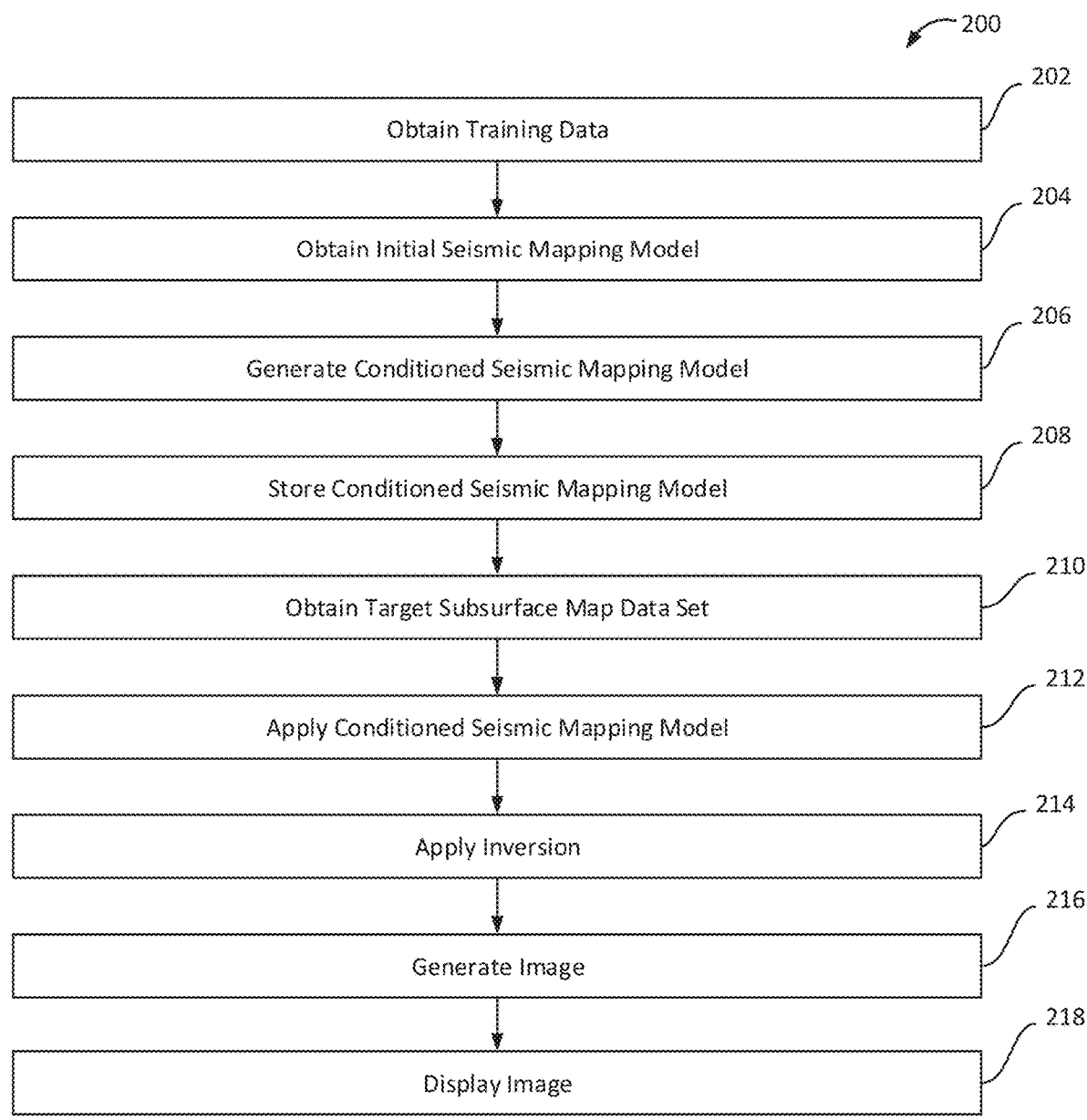
FIG. 2 illustrates a method for using probabilities of lithologies as prior information in an inversion, in accordance with one or more implementations.
Figure 3:
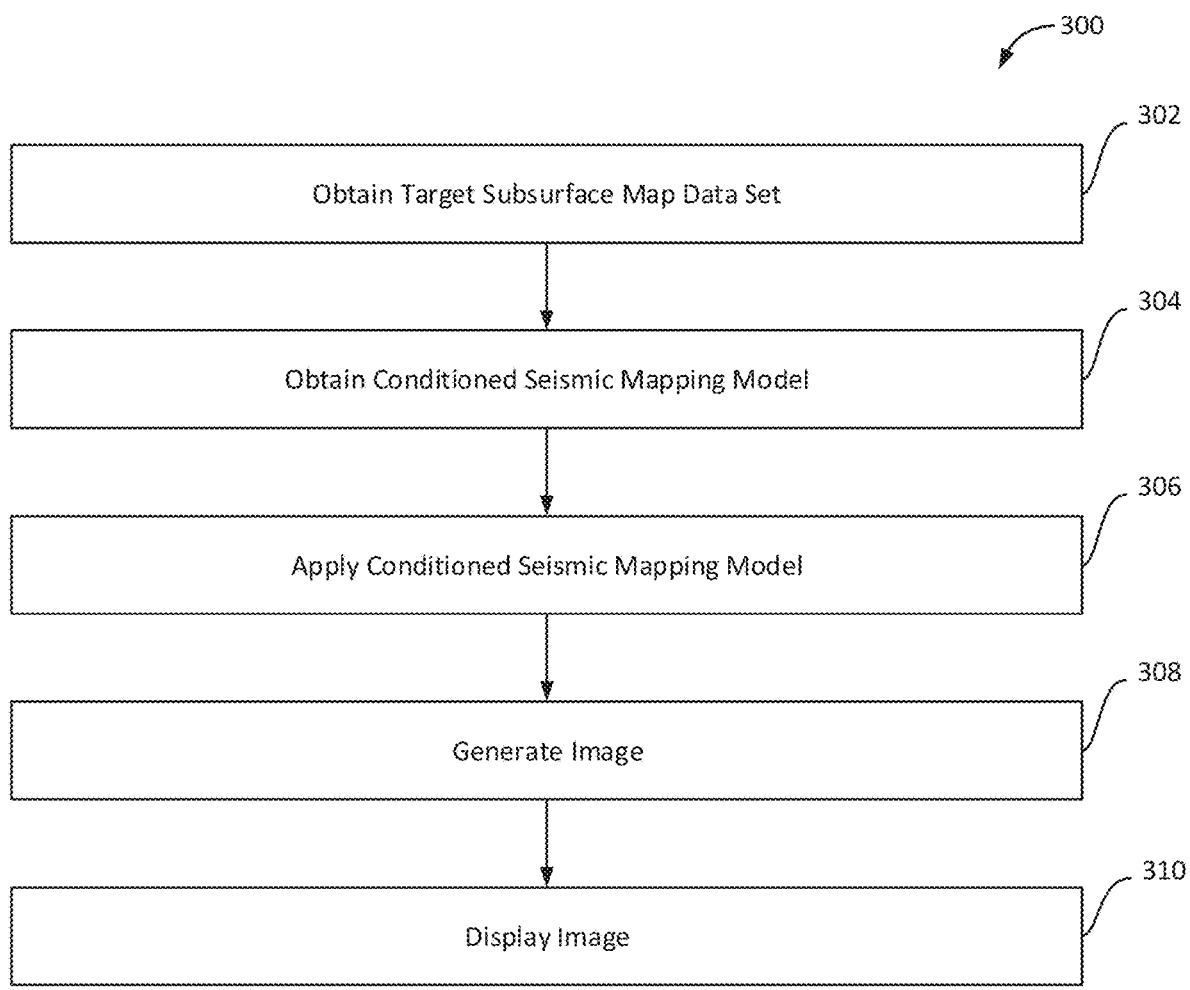
FIG. 3 illustrates a method for estimating lithologies within a subsurface volume of interest, in accordance with one or more implementations.
Figure 4:
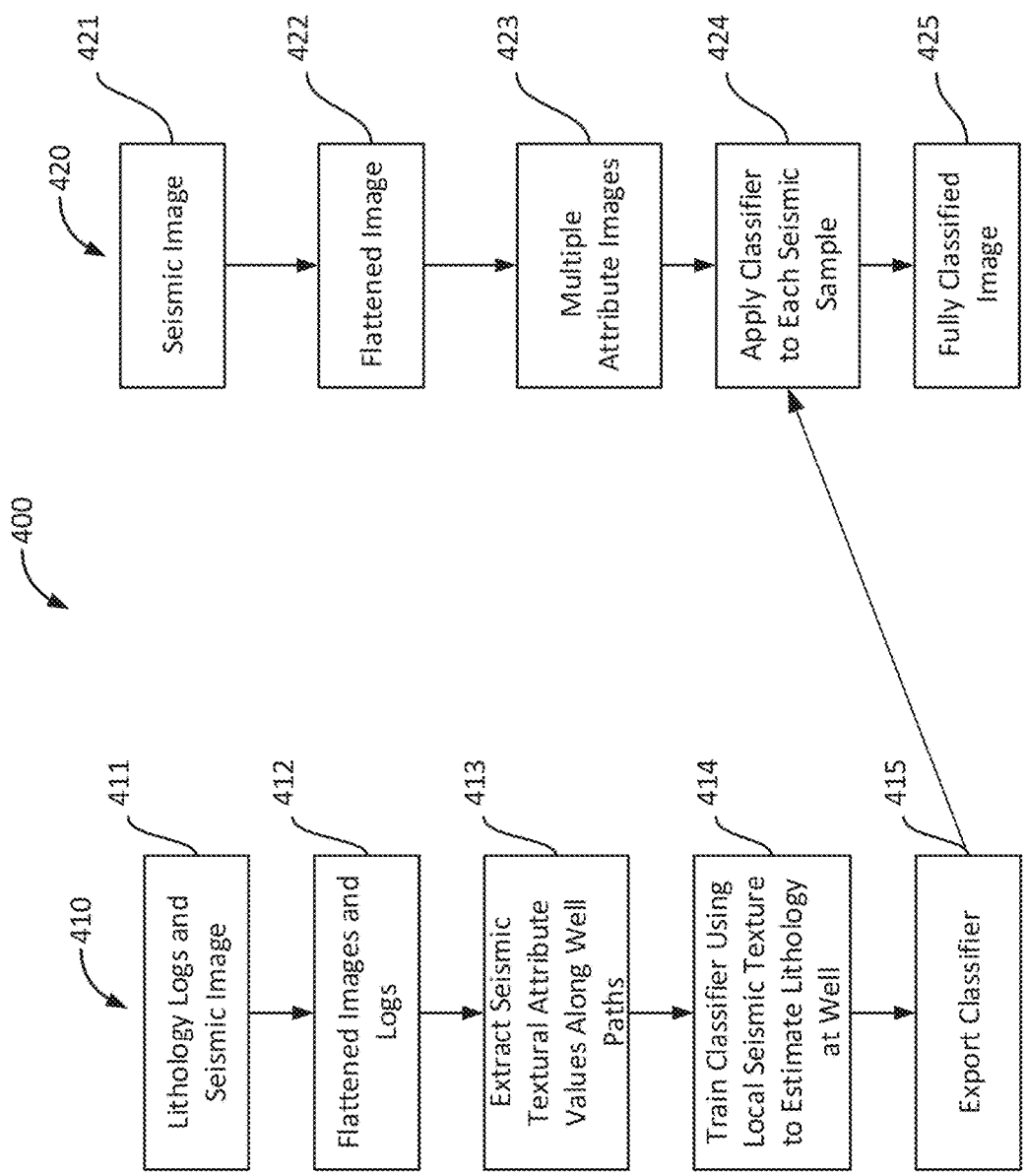
FIG. 4 illustrates a workflow for estimating lithologies within a subsurface volume of interest, in accordance with one or more implementations.
Figure 5A:
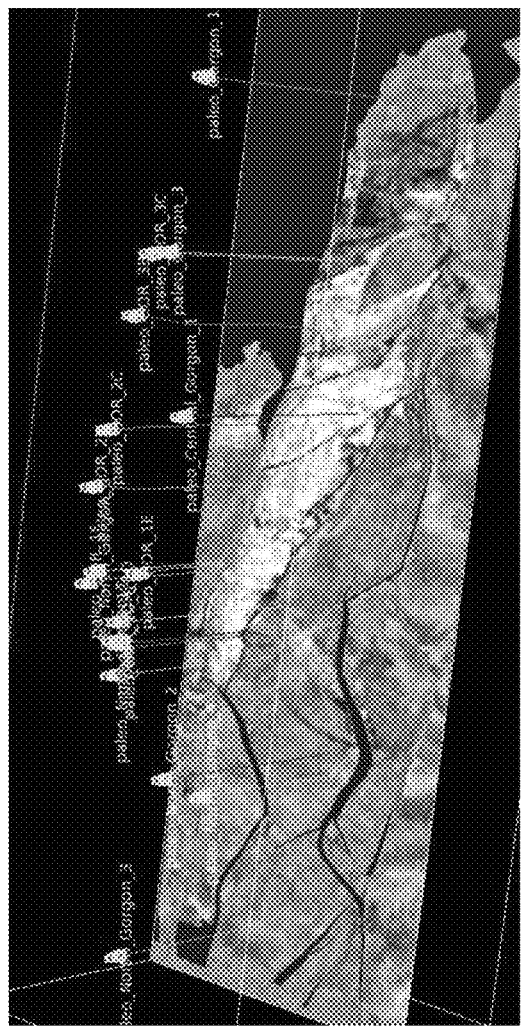
FIG. 5A illustrates a flattened seismic, in accordance with one or more implementations.
Figure 5B:
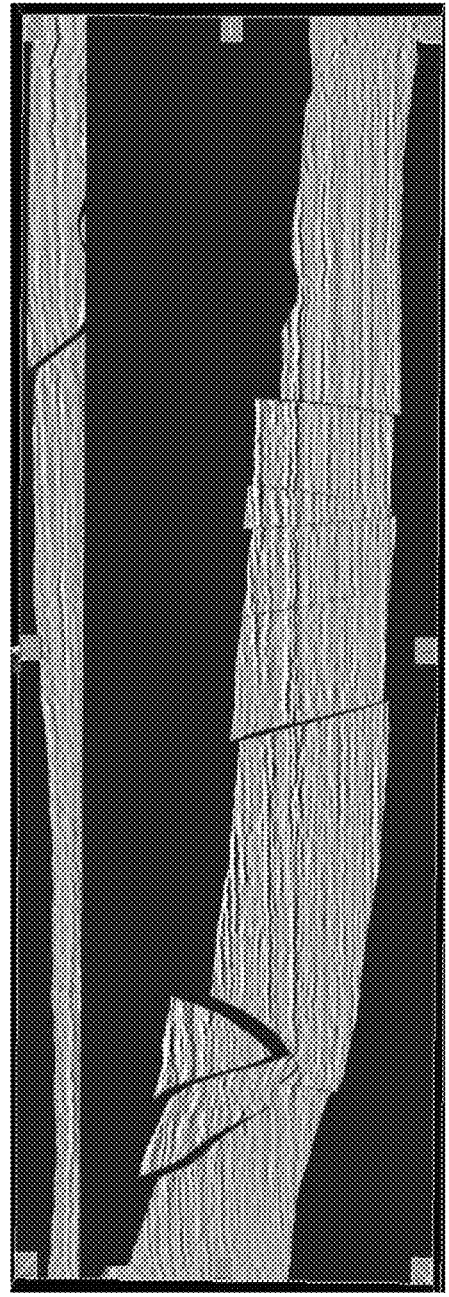
FIG. 5B illustrates a flattened seismic, in accordance with one or more implementations.
Figure 7A:
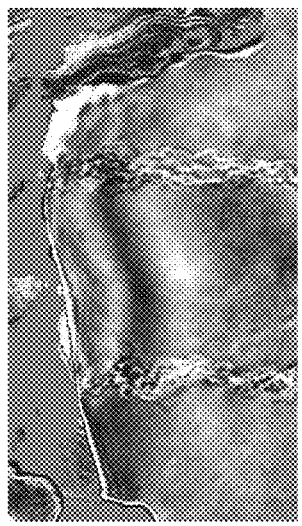
FIG. 7A illustrates an original image of a flattened slice, in accordance with one or more implementations.
Figure 7C:
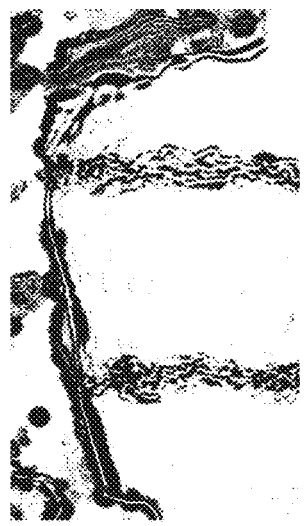
FIG. 7C illustrates a textural attribute applied to an image, in accordance with one or more implementations.
Figure 7E:
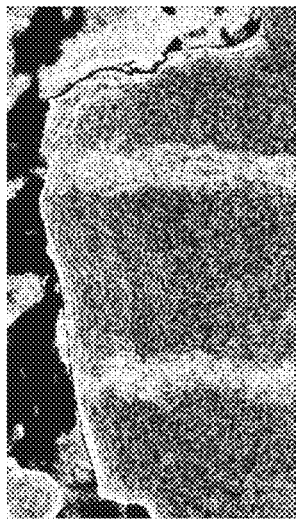
FIG. 7E illustrates a textural attribute applied to an image, in accordance with one or more implementations.
Figure 7B:
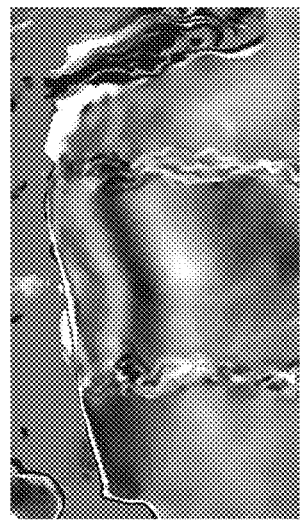
FIG. 7B illustrates a textural attribute applied to an image, in accordance with one or more implementations.
Figure 7D:
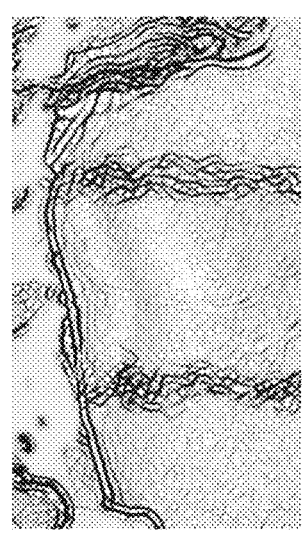
FIG. 7D illustrates a textural attribute applied to an image, in accordance with one or more implementations.

FIG. 2 illustrates a method for estimating lithologies within a subsurface volume of interest, in accordance with one or more implementations. The operations of methods 200 and 300 and workflows 400, 410, and 420 presented below are intended to be illustrative. In some implementations, methods 200 and 300 and workflows 400, 410, and 420 may be accomplished with one or more additional operations not described, and/or without one or more of the operations discussed. Additionally, the order in which the operations of methods 200 and 300 and workflows 400, 410, and 420 are illustrated in FIGS. 2-4 and described below is not intended to be limiting.

In some implementations, methods 200 and 300 and workflows 400, 410, and 420 may be implemented in one or more processing devices (e.g., a digital processor, an analog processor, a physical computer processor, a digital circuit designed to process information, an analog circuit designed to process information, a state machine, and/or other mechanisms for electronically processing information). The one or more processing devices may include one or more devices executing some or all of the operations of methods 200 and 300 and workflows 400, 410, and 420 in response to instructions stored electronically on an electronic storage medium. The one or more processing devices may include one or more devices configured through hardware, firmware, and/or software to be specifically designed for execution of one or more of the operations of methods 200 and 300 and workflows 400, 410, and 420.

An operation 202 may include obtaining, from electronic storage, training data. The training data may include subsurface map data sets specifying textural attribute values as a function of position corresponding to a subsurface volume of interest. In some implementations, the subsurface map data sets may be derived from seismic data and well data from the subsurface volume of interest. subsurface map data sets may be flattened.

The training data may include known lithologies as a function of position within the subsurface volume of interest may be known, such that the textural attribute values of the lithologies are known as a function of position within the subsurface volume of interest. Operation 202 may be performed by one or more physical computer processors configured by machine-readable instructions including a module that is the same as or similar to subsurface map data set module 108 and lithology module 110, in accordance with one or more implementations.

An operation 204 may include obtaining an initial seismic mapping model from the electronic storage. In some implementations, the initial seismic mapping model may include a random decision forest and/or another machine learning technique. Operation 204 may be performed by one or more physical computer processors configured by machine-readable instructions including a module that is the same as or similar to seismic mapping model module 112, in accordance with one or more implementations.

An operation 206 may include generating a conditioned seismic mapping model by training, on the one or more physical computer processors using the training data, the initial seismic mapping model. The conditioned seismic mapping model may include a random decision forest and/or another machine learning technique. Operation 206 may be performed by one or more physical computer processors configured by machine-readable instructions including a module that is the same as or similar to seismic mapping model module 112, in accordance with one or more implementations.

An operation 208 may include storing the conditioned seismic mapping model in the electronic storage. Operation 208 may be performed by one or more physical computer processors configured by machine-readable instructions including a module that is the same as or similar to seismic mapping model module 112, in accordance with one or more implementations.

An operation 210 may include obtaining a target subsurface map data set from the electronic storage. The target subsurface map data set may be derived from seismic data. Operation 210 may be performed by one or more physical computer processors configured by machine-readable instructions including a module that is the same as or similar to subsurface map data set module 108, in accordance with one or more implementations.

An operation 212 may include applying a conditioned seismic mapping model to the target subsurface map data set to generate a classified lithology map data set. Operation 212 may be performed by one or more physical computer processors configured by machine-readable instructions including a module that is the same as or similar to seismic mapping model module 112 and lithology map data set module 114, in accordance with one or more implementations.

An operation 214 may include applying an inversion to the classified lithology map data set to generate volumes of lithologies specifying parameters for individual lithologies as a function of position within the subsurface volume of interest. The inversion may be a stochastic AVA inversion. Operation 214 may be performed by one or more physical computer processors configured by machine-readable instructions including a module that is the same as or similar to lithology module 110, in accordance with one or more implementations.

An operation 216 may include generating an image. The image may be a two dimensional image or a three dimensional image. The image may represent the classified lithology map data set using visual effects to depict at least a portion of estimated lithologies in the classified lithology map data set as a function of position within the subsurface volume of interest. Operation 216 may be performed by one or more physical computer processors configured by machine-readable instructions including a module that is the same as or similar to image module 116, in accordance with one or more implementations.

An operation 218 may include displaying the image. The image may be displayed on a graphical user interface. Operation 218 may be performed by one or more physical computer processors configured by machine-readable instructions including a module that is the same as or similar to image module 116, in accordance with one or more implementations.

FIG. 3 illustrates a method for estimating lithologies within a subsurface volume of interest, in accordance with one or more implementations. An operation 302 may include obtaining a target subsurface map data set from the electronic storage. The target subsurface map data set may be derived from seismic data of a subsurface volume of interest surrounding the well. Operation 302 may be performed by one or more physical computer processors configured by machine-readable instructions including a module that is the same as or similar to subsurface map data set module 108, in accordance with one or more implementations.

An operation 304 may include applying a conditioned seismic mapping model to the target subsurface map data set to generate a classified lithology map data set. The conditioned seismic mapping model may include a random decision forest and/or another machine learning technique. Operation 304 may be performed by one or more physical computer processors configured by machine-readable instructions including a module that is the same as or similar to seismic mapping model module 112 and lithology map data set module 114, in accordance with one or more implementations.

An operation 308 may include generating an image. The image may be a two dimensional image or a three dimensional image. The image may represent the classified lithology map data set using visual effects to depict at least a portion of estimated lithologies in the classified lithology map data set as a function of position within the subsurface volume of interest. Operation 308 may be performed by one or more physical computer processors configured by machine-readable instructions including a module that is the same as or similar to image module 116, in accordance with one or more implementations.

An operation 310 may include displaying an image. The image may be displayed on a graphical user interface. Operation 310 may be performed by one or more physical computer processors configured by machine-readable instructions including a module that is the same as or similar to image module 116, in accordance with one or more implementations.

FIG. 4 illustrates a workflow for estimating lithologies within a subsurface volume of interest, in accordance with one or more implementations. Workflow 400 includes workflow 410 for training a model, or classifier and workflow 420 for classifying the subsurface volume of interest surrounding a well.

An operation 411 may include obtaining lithology logs and seismic images. The lithology logs may be obtained via a well. The seismic images may be derived from seismic data obtained using the setup shown in FIG. 13.

An operation 412 may include flattening the lithology logs and seismic images of operation 411. As described herein, the lithology logs and seismic images may be flattened.

An operation 413 may include obtaining seismic textural attribute values along the well path, where the lithology is known. Textural attributes may be applied to both the flattened lithology logs and seismic images to obtain textural attribute values as a function of position with the subsurface volume of interest.

An operation 414 may include training a classifier, through the use of machine learning, to estimate lithology at a well using the textural attribute values of operation 413. Training the classifier may include finding patterns in the textural attribute values corresponding to a given lithology.

An operation 415 may include exporting a trained classifier based on operation 414. Operation 415 may include storing the classifier in electronic storage.

Workflow 420 may be used to estimate lithologies within a subsurface volume of interest surrounding a well. An operation 421 may include obtaining seismic data of a subsurface volume of interest surrounding the well used in workflow 410. The seismic data may include seismic images and/or cubes.

An operation 422 may include flattening the seismic data of operation 421, as described herein.

An operation 423 may include obtaining textural attribute values from the seismic data of operation 422. Textural attributes may be applied to the flattened seismic data to obtain textural attribute values as a function of position within the subsurface volume of interest.

An operation 424 may include applying the classifier from workflow 410 to samples of the subsurface volume of interest. The classifier may be imported and applied to overlapping samples of the subsurface volume of interest.

An operation 425 may include generating and displaying a fully classified image of the subsurface volume of interest. The fully classified image of the subsurface volume of interest may estimate the probabilities of lithologies as a function of position within the subsurface volume of interest. The fully classified image may be displayed on a graphical user interface.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method for training a model that uses probabilities of lithologies as prior information in an inversion, the method being implemented in a computer system, the computer system including one or more physical computer processors and non-transient electronic storage that stores subsurface map data sets that correspond to different subsurface volumes of interest, wherein a given subsurface map data set corresponding to a given subsurface volume of interest specifies textural attribute values as a function of position within the given subsurface volume of interest, the method comprising:
  obtaining, from the electronic storage, training data, the training data including (i) subsurface map data sets specifying textural attribute values as a function of position corresponding to a subsurface volume of interest, and (ii) known lithologies as a function of position within the subsurface volume of interest, such that the textural attribute values of the lithologies are known as a function of position within the subsurface volume of interest;
  obtaining an initial seismic mapping machine learning model from the electronic storage;
  generating a conditioned seismic mapping machine learning model by training, on the one or more physical computer processors, the initial seismic mapping machine learning model using the training data;
  storing the conditioned seismic mapping machine learning model in the electronic storage;
  obtaining a target subsurface map data set for the subsurface volume of interest;
  applying the conditioned seismic mapping machine learning model to the target subsurface map data set to generate a classified lithology map data set, wherein the conditioned seismic mapping machine learning model receives as input the target subsurface map data set for the subsurface volume of interest and provides as output probabilities of lithologies for different locations within the subsurface volume of interest, the probabilities of lithologies for different locations within the subsurface volume of interest output by the conditioned seismic mapping machine learning model included within the classified lithology map data set;
  applying the inversion to the classified lithology map data set to generate volumes of lithologies specifying parameters for individual lithologies as a function of position within the subsurface volume of interest, wherein the probabilities of lithologies for different locations within the subsurface volume of interest provided by the classified lithology map data set are used as the prior information in the inversion such that the output of the conditioned seismic mapping machine learning model is used as input to the inversion;
  generating an image that represents the volumes of lithologies using visual effects to depict at least a portion of the parameters in the volumes of lithologies; and
  displaying, on a graphical user interface, the image.

2. The computer-implemented method of claim 1, wherein the classified lithology map data set estimates lithologies as a function of position within the subsurface volume of interest based on textural attribute values specified in the target subsurface map data set.

3. The computer-implemented method of claim 1, wherein the training data is derived from well data and seismic data.

4. The computer-implemented method of claim 1, wherein the initial seismic mapping machine learning model and the conditioned seismic mapping machine learning model comprise a random decision forest.

5. The computer-implemented method of claim 1, wherein the inversion comprises a stochastic amplitude variation with angle of incidence (AVA) inversion.

6. The computer-implemented method of claim 1, wherein the image indicates shale probabilities as a function of position within the subsurface volume of interest.

7. The computer-implemented method of claim 1, wherein the image indicates sand probabilities as a function of position within the subsurface volume of interest.

8. A computer-implemented method for estimating lithologies as a function of position within a subsurface volume of interest, the method being implemented in a computer system, the computer system including one or more physical computer processors and non-transient electronic storage that stores subsurface map data sets that correspond to different subsurface volumes of interest, wherein a given subsurface map data set corresponding to a given subsurface volume of interest specifies textural attribute values of different lithologies as a function of position within the given subsurface volume of interest, the method comprising:
  obtaining a target subsurface map data set for the subsurface volume of interest;
  obtaining a conditioned seismic mapping machine learning model from the electronic storage, the conditioned seismic mapping machine learning model having been conditioned by training an initial mapping machine learning model using training data, wherein the training data includes (i) subsurface map data sets specifying textural attribute values as a function of position corresponding to the subsurface volume of interest, and (ii) known lithologies as a function of position within the subsurface volume of interest, such that the textural attribute values of the lithologies are known as a function of position within the subsurface volume of interest;
  applying the conditioned seismic mapping machine learning model to the target subsurface map data set to generate a classified lithology map data set, wherein the conditioned seismic mapping machine learning model receives as input the target subsurface map data set for the subsurface volume of interest and provides as output probabilities of lithologies for different locations within the subsurface volume of interest, the probabilities of lithologies for different locations within the subsurface volume of interest output by the conditioned seismic mapping machine learning model included within the classified lithology map data set;
  generating an image that represents the classified lithology map data set using visual effects to depict at least a portion of estimated lithologies within the subsurface volume of interest, wherein the estimated lithologies as a function of position within the subsurface volume of interest are determined based on application of an inversion to the classified lithology map data set, wherein the probabilities of lithologies for different locations within the subsurface volume of interest provided by the classified lithology map data set are used as prior information in the inversion such that the output of the conditioned seismic mapping machine learning model is used as input to the inversion; and
  displaying, on a graphical user interface, the image.

9. The computer-implemented method of claim 8, wherein the classified lithology map data sets estimate lithologies as a function of position within the subsurface volume of interest based on textural attribute values specified in the target subsurface map data set.

10. The computer-implemented method of claim 8, wherein the application of the inversion to the classified lithology map data set comprises using amplitude variation with angle of incidence (AVA) inversion on the classified lithology map data set.

11. The computer-implemented method of claim 8, wherein the initial seismic mapping machine learning model and the conditioned seismic mapping machine learning model comprise a random decision forest.

12. The computer-implemented method of claim 8, wherein the target subsurface map data set comprises textural attribute values derived from seismic data corresponding to the subsurface volume of interest.

13. The computer-implemented method of claim 8, wherein the image indicates shale probabilities as a function of position within the subsurface volume of interest.

14. The computer-implemented method of claim 8, wherein the image indicates sand probabilities as a function of position within the subsurface volume of interest.

15. A computer system for training a model that estimates lithologies as a function of position within a subsurface volume of interest, the system comprising:
   one or more physical computer processors;
   non-transient electronic storage that stores subsurface map data sets that correspond to different subsurface volumes of interest, wherein a given subsurface map data set corresponding to a given subsurface volume of interest specifies textural attribute values of different lithologies as a function of position within the given subsurface volume of interest;
   memory; and
   one or more programs, wherein the one or more programs are stored in the memory and configured to be executed by the one or more physical computer processors, the one or more programs including instructions that when executed by the one or more physical computer processors cause the system to:
   obtain training data from the electronic storage, the training data including (i) subsurface map data sets specifying textural attribute values as a function of position corresponding to a subsurface volume of interest, and (ii) known lithologies as a function of position within the subsurface volume of interest, such that the textural attribute values of the lithologies are known as a function of position within the subsurface volume of interest;
   obtain an initial seismic mapping machine learning model from the electronic storage;
   generate a conditioned seismic mapping machine learning model by training, on the one or more physical computer processors, the initial seismic mapping machine learning model using the training data;
   store the conditioned seismic mapping machine learning model in the electronic storage;
   obtain a target subsurface map data set for the subsurface volume of interest;
   apply the conditioned seismic mapping machine learning model to the target subsurface map data set to generate a classified lithology map data set, wherein the conditioned seismic mapping machine learning model receives as input the target subsurface map data set for the subsurface volume of interest and provides as output probabilities of lithologies for different locations within the subsurface volume of interest, the probabilities of lithologies for different locations within the subsurface volume of interest output by the conditioned seismic mapping machine learning model included within the classified lithology map data set;
   generate an image that represents the classified lithology map data set using visual effects to depict at least a portion of estimated lithologies within the subsurface volume of interest, wherein the estimated lithologies as a function of position within the subsurface volume of interest are determined based on application of an inversion to the classified lithology map data set, wherein the probabilities of lithologies for different locations within the subsurface volume of interest provided by the classified lithology map data set are used as prior information in the inversion such that the output of the conditioned seismic mapping machine learning model is used as input to the inversion; and
   display, on a graphical user interface, the image.

16. The computer system of claim 15, wherein the classified lithology map data set estimates a probability of a type of lithology as a function of position within the subsurface volume of interest to textural attribute values specified in the target subsurface map data set.

17. The computer system of claim 15, wherein the application of the inversion to the classified lithology map data set comprises using amplitude variation with angle of incidence (AVA) inversion on the classified lithology map data set.

18. The computer system of claim 15, wherein the initial seismic mapping machine learning model and the conditioned seismic mapping machine learning model comprise a random decision forest.

19. The computer system of claim 15, wherein the target subsurface map data set comprises textural attribute values derived from seismic data corresponding to the subsurface volume of interest.

* * * * *